(12) United States Patent
Goh et al.

(10) Patent No.: US 11,834,026 B2
(45) Date of Patent: *Dec. 5, 2023

(54) PURPOSEFUL BRAKE-INDUCED WHEEL LOCKUP FOR VEHICLE STABILITY CONTROL

(71) Applicant: TOYOTA RESEARCH INSTITUTE, INC., Los Altos, CA (US)

(72) Inventors: Yan Ming Jonathan Goh, Palo Alto, CA (US); John Subosits, Menlo Park, CA (US); Michael Thompson, San Juan Capistrano, CA (US); Alexander R. Green, Redwood City, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/335,497

(22) Filed: Jun. 1, 2021

(65) Prior Publication Data

US 2022/0379858 A1 Dec. 1, 2022

(51) Int. Cl.
*B60T 8/1755* (2006.01)
*B60T 8/24* (2006.01)
*B60T 8/171* (2006.01)

(52) U.S. Cl.
CPC .......... *B60T 8/17551* (2013.01); *B60T 8/171* (2013.01); *B60T 8/246* (2013.01); *B60T 2250/03* (2013.01)

(58) Field of Classification Search
None
See application file for complete search history.

(56) References Cited

U.S. PATENT DOCUMENTS 5,303,986 A * 4/1994 VanDeMotter ....... B60T 13/585
303/3
5,897,601 A 4/1999 Suzuki
(Continued)

FOREIGN PATENT DOCUMENTS

CN 105253141 1/2016
CN 107009916 8/2017
(Continued)

OTHER PUBLICATIONS

Machine Translation of "Guo" CN105691381 (Year: 2018).*
(Continued)

*Primary Examiner* — Christian Chace
*Assistant Examiner* — Scott R Jagolinzer
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods for controlling a vehicle may include receiving sensor data from a plurality of sensors, the sensor data including vehicle parameter information for the vehicle; using the sensor data to determine a vehicle state for a vehicle negotiating a corner, wherein the vehicle state comprises information regarding a magnitude of an effective understeer gradient for the vehicle; computing a yaw moment required to correct the effective understeer gradient based on the magnitude of the effective understeer gradient; and applying a brake torque to a single wheel of the vehicle, wherein an amount of brake torque applied is sufficient to lock up the single wheel to create a yaw moment on the vehicle to achieve the computed yaw moment required to correct the effective understeer gradient.

30 Claims, 8 Drawing Sheets

(56) References Cited

U.S. PATENT DOCUMENTS

| | | | |
|---|---|---|---|
| 2004/0262991 A1* | 12/2004 | Anwar | B60T 8/1755 303/140 |
| 2005/0038588 A1* | 2/2005 | Shukla | B60T 8/1755 701/80 |
| 2008/0086251 A1* | 4/2008 | Lu | B60T 8/1755 701/70 |
| 2010/0057284 A1 | 3/2010 | Tang | |
| 2011/0288697 A1 | 11/2011 | Yu | |
| 2015/0002284 A1 | 1/2015 | Matsuno | |
| 2017/0232942 A1 | 8/2017 | Feinauer | |
| 2022/0379858 A1 | 12/2022 | Goh | |

FOREIGN PATENT DOCUMENTS

| | | | |
|---|---|---|---|
| CN | 105691381 | * | 4/2018 |
| WO | 2014058297 | | 4/2014 |
| WO | 2016121546 | | 8/2016 |

OTHER PUBLICATIONS

Rubin et al. "Vehicle Yaw Stability Control Using Rear Active Differential via Sliding Mode Control Methods," 21st Mediterranean Conference on Control & Automation (MED); Platanias-Chania, Crete, Greece, Jun. 25-28, 2013; pp. 317-322.

Wang et al., "Anti-lock Brake System for Integrated Electric Parking Brake Actuator Based on Sliding-mode Control," ArXiv, 2018, 14 pages.

Ding et al., "Sliding Mode Direct Yaw-Moment Control Design for In-Wheel Electric Vehicles," in IEEE Transactions on Industrial Electronics, vol. 64, No. 8, Aug. 2017, 11 pages.

Ali et al., "Towards Predictive Yaw Stability Control," 2009 IEEE Intelligent Vehicles Symposium, pp. 852-857.

\* cited by examiner

PURPOSEFUL BRAKE-INDUCED WHEEL LOCKUP FOR VEHICLE STABILITY CONTROL

CROSS REFERENCE TO RELATED APPLICATIONS

This application is related to U.S. patent application Ser. No. 17/335,567, filed Jun. 1, 2021 and which is incorporated herein by reference in its entirety.

TECHNICAL FIELD

The present disclosure relates generally to vehicle stability control, and in particular, some implementations relate to induced wheel lockup for enhanced vehicle control.

DESCRIPTION OF RELATED ART

Electronic Stability Control (ESC) is a computer-based vehicle safety technology that monitors vehicle parameters like the direction of the tires and steering angle to detect, and hopefully prevent, an out-of-control situation. A vehicle's ESC system may monitor for discrepancies between the intended direction of the vehicle and the movement of the car's wheels. If a discrepancy is detected, the ESC system may apply automatic computer-controlled braking of one or more of the individual wheels to assist the driver in maintaining control of the vehicle and maintaining the vehicles intended heading in situations where the vehicle is beginning to lose directional stability. This can help avoid out-of-control situations including, for example, oversteer (spin out), understeer (plowing), two-wheel lift, vehicle rollover and tire debeading.

An ESC system maintains vehicle yaw control by using sensor data to determine the driver's intended heading and measure the vehicle's actual response. Where the driver is at or near the boundaries of the performance envelope of the vehicle, the ESC system may step in to assist, such as by automatically turning the vehicle if its response does not match the driver's intention. With ESC systems, this turning may be accomplished by applying a braking force at a determined wheel to achieve a yaw torque or moment that rotates the vehicle around a vertical axis.

Conventional wisdom is that wheel lockup should not occur when trying to stabilize the vehicle such as through an ESC system or in autonomous driving maneuvers. Indeed, conventional solutions use antilock braking systems (ABS) to accurately control a slip ratio between the road surface and the vehicle wheels.

BRIEF SUMMARY OF THE DISCLOSURE

According to various embodiments of the disclosed technology a method for controlling a vehicle, may include: receiving sensor data from a plurality of sensors, the sensor data comprising vehicle parameter information for the vehicle; using the sensor data to determine a vehicle state for a vehicle negotiating a corner, wherein the vehicle state comprises information regarding a magnitude of an effective understeer gradient for the vehicle; computing a yaw moment required to correct the effective understeer gradient based on the magnitude of the effective understeer gradient; and applying a brake torque to a single wheel of the vehicle, wherein an amount of brake torque applied is sufficient to lock up the single wheel to create a yaw moment on the vehicle to achieve the computed yaw moment required to correct the effective understeer gradient.

Embodiments may further include determining yaw moments that can be achieved for the vehicle with wheel lockup and without wheel lockup, and determining, based on the yaw moment required to correct the effective understeer gradient, whether wheel lockup is required to achieve the yaw moment required.

Embodiments may further include determining a duration of the brake torque to apply to of the single wheel of the vehicle and applying the brake torque to the single wheel for the determined duration.

Embodiments may further include determining whether lockup of the single wheel is required to achieve the yaw moment required to correct the effective understeer gradient, and only applying an amount of brake torque sufficient to lock up the single wheel in circumstances where lockup is required.

The sensor data may include yaw data and steering angle data.

Applying a brake torque to a single wheel of the vehicle to achieve the computed yaw moment required to correct the effective understeer gradient may include substantially matching the yaw moment required to correct the effective understeer gradient.

Applying a brake torque to a single wheel of the vehicle to achieve the computed yaw moment required to correct the effective understeer gradient may include achieving a yaw moment a determined amount less than the amount required to correct the effective understeer gradient to avoid over-correcting the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The FIGS. are provided for purposes of illustration only and merely depict typical or example embodiments.

Figure 1:
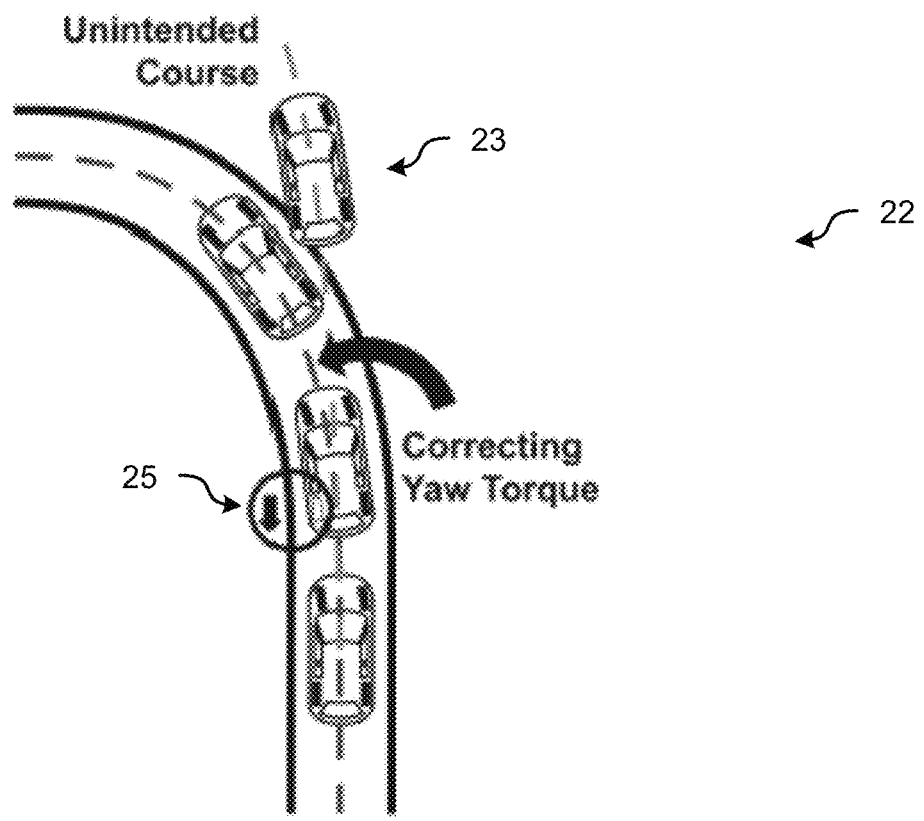
FIG. 1 illustrates two scenarios that may be avoided by embodiments of the systems and methods described herein.
Figure 1:
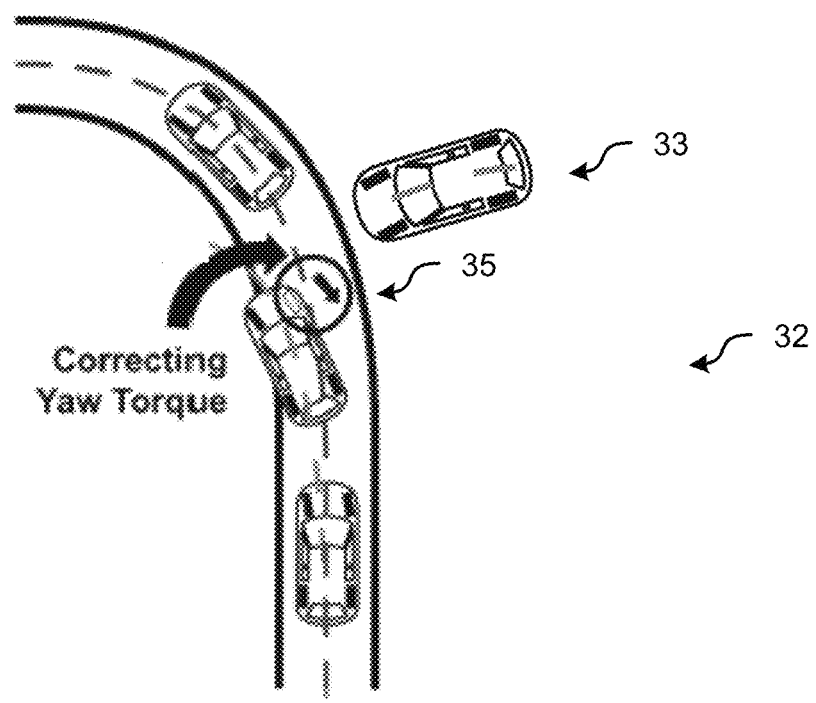

The figures are not exhaustive and do not limit the present disclosure to the precise form disclosed.

DETAILED DESCRIPTION

Embodiments of the technology disclosed herein can provide systems and methods for adapting a yaw rate of a vehicle according to a desired directional intent of the vehicle. Intentional wheel lockup may be used as a means to create an increased yaw moment beyond that using ESC or autonomous driving modes that operate only in the rolling region of the wheels. Such wheel lockup may be applied to one or more selected wheels of the vehicle to induce an increased yaw moment of the vehicle. The yaw rate may be defined in various embodiments as the angular velocity of rotation (i.e., the rate of change of the vehicles heading angle) measured in degrees per second, or radians per second of rotation about a vertical axis through the vehicle.

For driver-operated vehicles, sensor data providing vehicle parameters such as speed and steering angle measurements may be used to determine the driver's intended heading. Accelerometers may be used to measure the vehicle response such as in terms of lateral acceleration and yaw rate. In situations where the vehicle is responding in a manner that corresponds to the driver input, the yaw rate should be in balance with the speed and lateral acceleration of the vehicle. If the yaw rate is not in balance, such as in an understeer or oversteer situation, the system may be configured to apply braking to one or more wheels to increase or decrease the actual yaw rate. In some situations, this may be accomplished without inducing wheel lockup, and therefore a normal ESC operation may take place. In more severe situations, however, the yaw rate achievable using conventional ESC solutions might not be sufficient to correct the yaw-imbalance problem. Accordingly, some embodiments may be configured to apply braking to one or more vehicle wheels to induce wheel lockup, increasing or decreasing the vehicle yaw rate as desired, thereby providing more aggressive vehicle control than conventional ESC solutions.

In further applications, such as in autonomous vehicle and other situations, wheel lockup can be provided to help control vehicle heading and to otherwise improve vehicle performance. Embodiments may be implemented to use selective wheel lockup to stabilize the vehicle and to cause the vehicle to travel in a different direction to avoid a collision or to mitigate damage in an unavoidable collision. Solutions implemented in autonomous vehicles may be combined with other inputs available with such vehicles, such as steering correction for example, to enhance the amount of control applied to the vehicle. Additionally, where a collision may be unavoidable, embodiments may be implemented to adjust the yaw of the vehicle to control which part of the vehicle bears the impact (or the brunt of the impact) of the collision. In this document, autonomous vehicles are not limited to fully automated driving, but can instead refer to automation at various degrees, such as at any of SAE automation levels 1-5, for example.

FIG. 1 illustrates two scenarios that may be avoided or mitigated by embodiments of the systems and methods described herein. Particularly, FIG. 1 illustrates an example of understeer 22 and an example of oversteer 32. In the example of understeer 22, the vehicle is traveling along a roadway and encounters a left-hand curve. Upon entering the curve, the driver turns the steering wheel to the left in an attempt to negotiate the curve. However, where understeer occurs, the vehicle continues to plow straight (or relatively straight) ahead as illustrated at position 23 despite the fact that the driver attempted to turn to the left. In other words, the vehicle under rotates and pushes wide. Understeer may be caused, for example, by applying an excessive amount of steering angle to quickly, such as when the vehicle speed and steering angle exceed the available grip of the front tires.

In the example of oversteer 32, the vehicle is traveling along the same roadway and encounters the same left-hand curve. As with the previous example of understeer, the driver turns the steering wheel to the left in an attempt to negotiate the curve. However, in this case the vehicle rotates more than the angle otherwise dictated by the steering input, which is oversteer. In other words, the rear tires slide sideways causing the rear end of the vehicle to slip out. An example of this is illustrated at position 33. Instead of the vehicle under rotating as with the example of understeer 22, here the vehicle over rotates, which could cause the vehicle to spin out.

Applying a yaw torque induced by applying braking torque at an individual wheel can help to mitigate or prevent understeer and oversteer. In some embodiments, the application of braking torque at an individual wheel can be implemented to provide control to achieve a desired amount understeer and oversteer. With continued reference to FIG. 1, in the example of understeer 22 application of a braking force 25 to the left rear wheel of the vehicle places a yaw moment on the vehicle causing it to rotate counterclockwise (to the left) as illustrated by the arrow. This helps to mitigate or may even eliminate the understeer that might otherwise occur without this braking force 25. In the example of oversteer 32, application of a braking force 35 to the right front wheel places a yaw moment on the vehicle causing it to rotate clockwise (to the right) as illustrated by the arrow. This helps to mitigate or may even eliminate the oversteer that might otherwise occur without application of this braking force 35.

Figure 2:
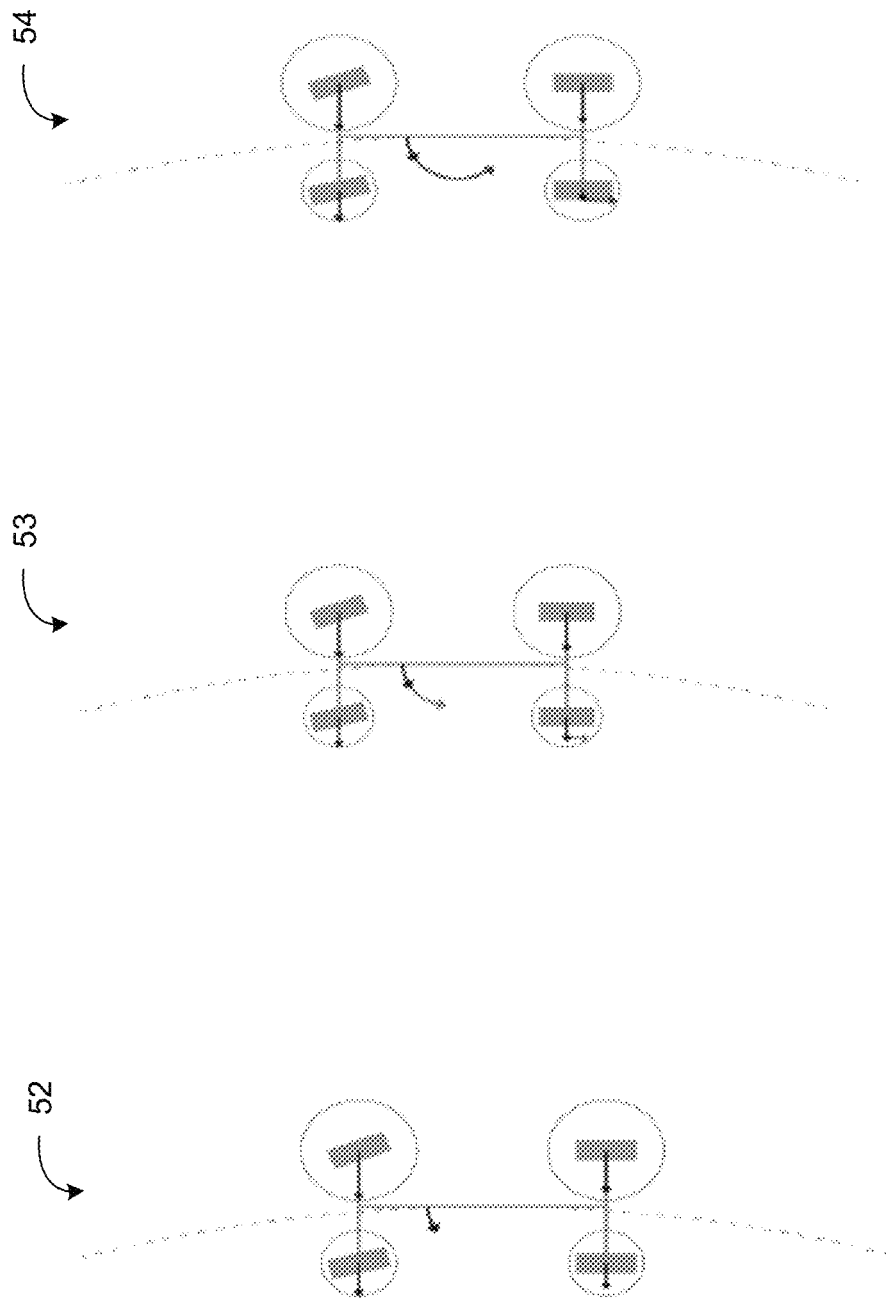
FIG. 2 illustrates an example of the effect of braking forces on individual wheels.

FIG. 2 illustrates an example of the effect of braking forces on individual wheels. This example illustrates three conditions: no individual braking force applied to the wheels 52, applying a non-lockup braking force to the left rear wheel 53 and applying a lockup braking force to the left rear wheel 54. In the case of situation 52 (no individual braking force applied to the wheels), the yaw moment applied to the vehicle is primarily a result of steering angle input and, of course, friction of the tires. Situation 53 (applying a non-lockup braking force to the left rear wheel) exemplifies a normal ESC situation in which braking torque is applied to the left rear wheel without locking up the left rear wheel. This braking torque causes an increased counterclockwise yaw moment as compared to situation 52. Situation 54 (applying a lockup braking force to the left rear wheel) exemplifies an embodiment of the systems and methods disclosed herein in which a braking torque sufficient to cause wheel lockup is applied to the left rear wheel. This results in a greater yaw moment relative to situation 53. Accordingly, as compared to situation 53, this may provide even greater correction of an understeer situation.

There is friction circle coupling between the longitudinal and lateral forces produced at the tire contact patch. Generally, these forces (such as generated by braking/acceleration, and cornering) when combined, cannot exceed the boundaries set by the friction circle. Stated another way as an example, when the vehicle is braking, less friction is available for cornering. When the selected wheel is locked up, this creates a force that is 'saturated' at a constant magnitude, and pointed directly opposite to the relative velocity vector between the tire contact patch and the road. Thus, by controlling the wheel speed the system can control the direction of the force vector from the tire. More specifically, inducing lockup reduces lateral forces to create greater net yaw moments.

With ESC solutions applying ABS, the wheel is generally free rolling, or very close to free rolling speed. In some embodiments, rather than applying full wheel lockup, a partial wheel lockup can be applied. This can include partial lockup that is less than the free rolling speed, which can be expressed in terms of wheel speed as 0<partial lockup<free rolling speed. Embodiments may be implemented in which the partial lockup is less than the ESC rolling speed, which itself might be something less than free rolling speed.

Figure 3:
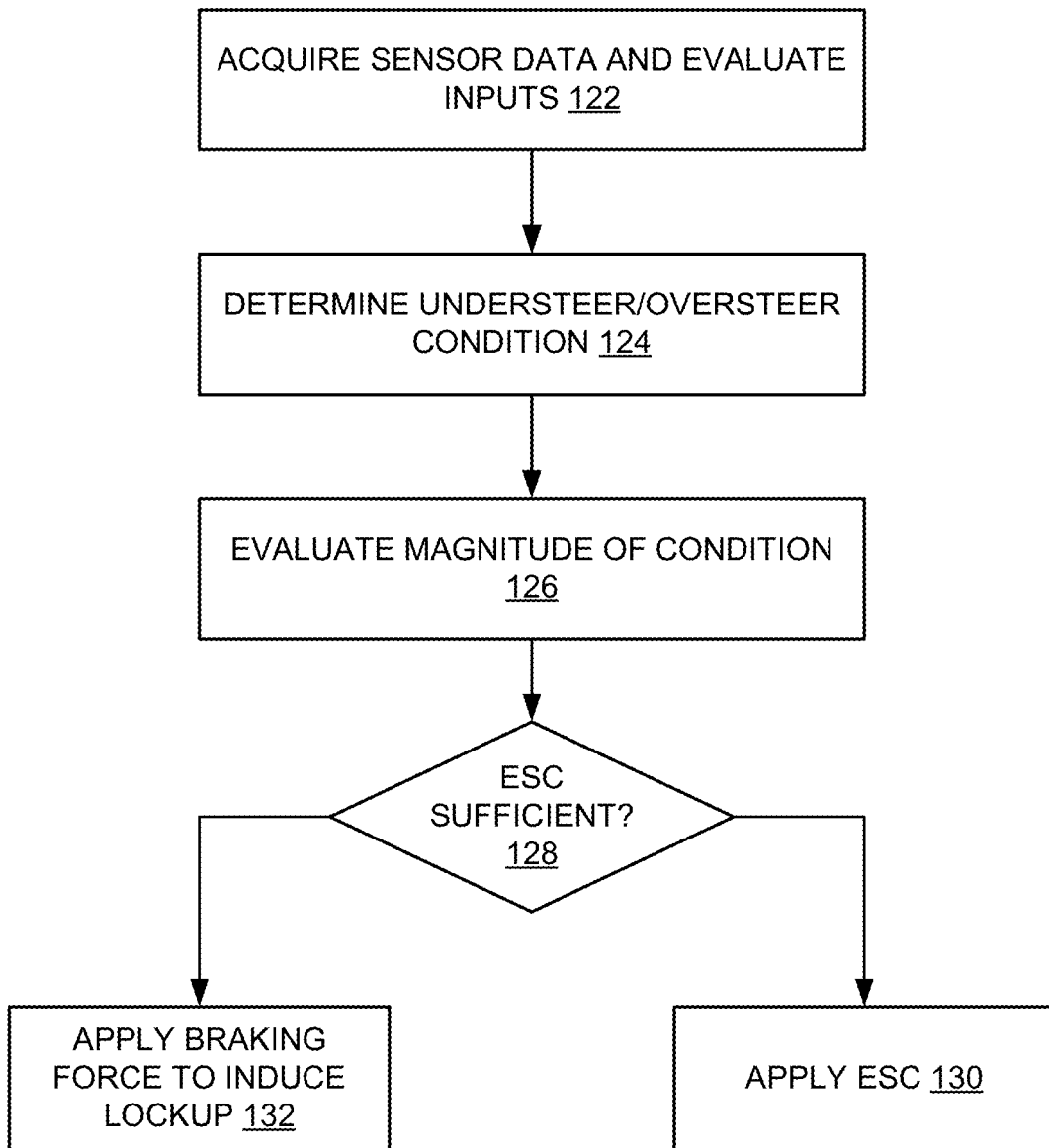
FIG. 3 illustrates an example of adapting vehicle yaw rate in accordance with various embodiments of the systems and methods described herein.

FIG. 3 illustrates an example of adapting vehicle yaw rate in accordance with various embodiments. With reference now to FIG. 3, at operation 122 the system acquires data from vehicle sensors and evaluates the data. For example in the case of controlling understeer and oversteer situations, the system may receive and evaluate vehicle parameters such as, for example, vehicle speed, steering angle, throttle position, braking amount, tire pressure, tire type, tire wear suspension settings, vehicle loading and so on. In some embodiments, the system may also evaluate environmental parameters such as, for example, road surface conditions, temperature, weather, and so on.

At operation 124, the system evaluates the sensor information to determine whether a condition requiring correction is about to occur (or has begun to occur) such as a yaw-imbalance condition. Such a yaw-imbalance condition requiring correction may include, for example, an understeer or an oversteer event. In some applications, the system may have sufficient information (e.g., including routing and lane information) to perform envelope calculations and predict that an understeer or oversteer situation is about to occur. Such information may be available, for example, from systems employed with autonomous vehicles, from GPS or other routing systems, crowd sourced from other vehicles or received from infrastructure elements (e.g., via V2V and V2I communications) and so on. In other applications, the system may only be able to detect an understeer or oversteer situation as it is just beginning to occur.

At operation 126, the system evaluates the magnitude of the condition requiring correction. The system can be configured to determine the amount of yaw correction required to mitigate the yaw-imbalance condition adequately, and to further determine at operation 128 whether conventional ESC measures (i.e., without wheel lockup) would be sufficient to mitigate the condition adequately. If at operation 128 the system determines that conventional ESC measures are sufficient to mitigate the condition adequately without wheel lockup, the system applies the ESC measures at operation 130. If, on the other hand, at operation 128 the system determines that conventional ESC measures are not sufficient to mitigate the condition adequately, the system applies sufficient braking force to induce wheel lockup at operation 132. For example, in the case of understeer the system can apply will lockup to the inside rear wheel of the vehicle to apply a yaw moment in the direction of the turn; and in the case of oversteer, the system can apply will lockup to the outside front wheel of the vehicle to apply a yaw moment counter to the direction of the turn to bring the rear end of the vehicle back in line.

The timing and duration of the wheel lockup can be computed to provide the amount of yaw moment needed to correct the situation or to otherwise help to control the vehicle throughout the turn. In various embodiments, the system can be configured to apply a single lockup event to implement the correction, whereas in other embodiments the system may determine that multiple sequential lockup events are necessary to implement the correction. While some embodiments may be actuated to correct for the yaw-imbalance condition to bring the vehicle in line and prevent accidents, other embodiments may be implemented to improve the performance envelope of the vehicle or to induce desired vehicle behavioral characteristics. For example, using wheel lockup to increase the desired yaw-moment applied to a vehicle from selective braking may enable the vehicle to negotiate corners faster. While both theoretically achieve the same or similar results, the former case may be thought of as correcting for an unwanted condition that is occurring or that is about to occur, whereas the latter case may be thought of as enabling greater vehicle speeds without encountering the unwanted condition.

Figure 4:
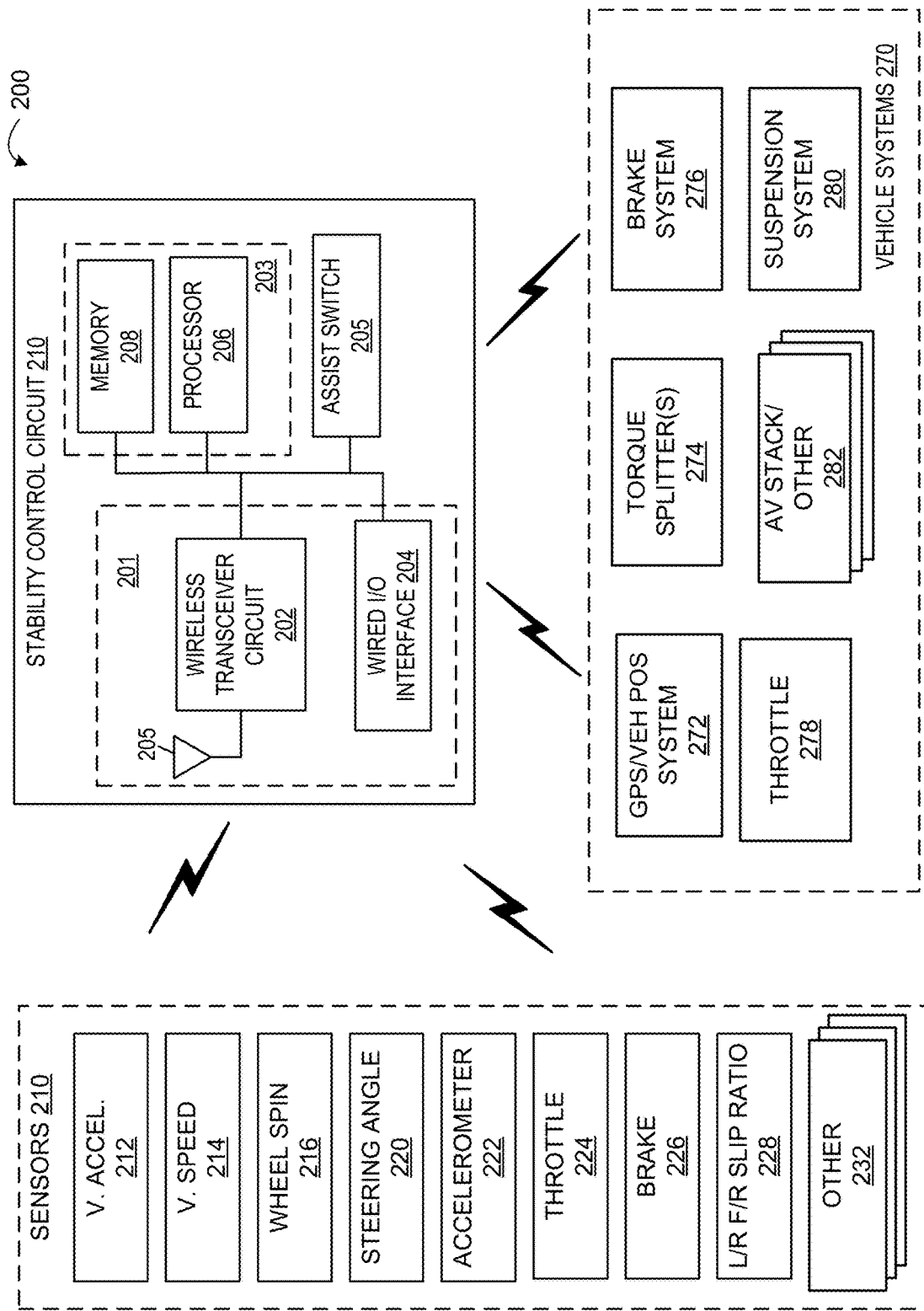
FIG. 4 illustrates an example architecture for vehicle stability control in accordance with embodiments of the systems and methods described herein.

FIG. 4 illustrates an example architecture for vehicle stability control in accordance with embodiments of the systems and methods described herein. Referring now to Figure, in this example, vehicle stability control system 200 includes a vehicle stability control module 210, a plurality of sensors 210 and a plurality of vehicle systems 270. Sensors 210 and vehicle systems 270 can communicate with vehicle stability control module 210 via a wired or wireless communication interface. Although sensors 210 and vehicle systems 270 are depicted as communicating with vehicle stability control module 210, they can also communicate with each other as well as with other vehicle systems. Vehicle stability control module 210 can be implemented as a vehicle electronic control unit (ECU) or as part of an ECU. In other embodiments, vehicle stability control module 210 can be implemented independently of the ECU.

Vehicle stability control module 210 in this example includes a communication circuit 201 and a decision circuit 203 (including a processor 206 and memory 208 in this example). Components of vehicle stability control module 210 are illustrated as communicating with each other via a data bus, although other communication in interfaces can be included.

Processor 206 can include one or more GPUs, CPUs, microprocessors, or any other suitable processing system. Processor 206 may include one or more single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to vehicle stability control module 210.

Although the example of FIG. 4 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a vehicle stability control module 210.

Communication circuit 201 includes either or both a wireless transceiver circuit 202 with an associated antenna 214 and a wired I/O interface 204 with an associated hardwired data port (not illustrated). As this example illustrates, communications with vehicle stability control module 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by vehicle stability control module 210 to/from other entities such as sensors 210 and vehicle systems 270.

Wired I/O interface 204 can include a transmitter and a receiver (not shown) for hardwired communications with other devices. For example, wired I/O interface 204 can provide a hardwired interface to other components, including sensors 210 and vehicle systems 270. Wired I/O interface 204 can communicate with other devices using Ethernet or any of a number of other wired communication protocols whether standardized, proprietary, open, point-to-point, networked or otherwise.

Sensors 210 can include, for example, standard vehicle sensors typically included in a vehicle for normal vehicle operations and may further include additional sensors that may or may not otherwise be included on a standard vehicle with which the stability control system 200 is implemented. In the illustrated example, sensors 210 include one or more of the following: vehicle acceleration sensors 212, vehicle speed sensors 214, wheelspin sensors 216 (e.g., one for each wheel), a steering angle sensor 220, accelerometers 222 (such as a 3-axis accelerometer to detect roll, pitch and yaw of the vehicle), throttle sensors 224, break sensors 226, and left-right and front-rear slip ratio sensors 228. Additional sensors 232 can also be included as may be appropriate for a given implementation of the system 200. These might include, for example, a tire pressure monitoring system (TPMS), environmental sensors, and so on.

Vehicle systems 270 can include any of a number of different vehicle components or subsystems used to control or monitor various aspects of the vehicle and its performance. In this example, the vehicle systems 270 include a GPS or other vehicle positioning system 272; torque splitters 274 that can control distribution of power among the vehicle wheels such as, for example, by controlling front/rear and left/right torque split; brake control circuits 276 to control braking of the vehicle (e.g. to control braking at individual wheels); vehicle throttle 278; and suspension system 280 such as, for example, an adjustable-height air suspension system, or an adjustable-damping suspension system. Vehicle systems 272 may also include other vehicle systems 282, which may include, for example an AV that includes various autonomous vehicle systems to, for example, control operation of the autonomous vehicle including its steering.

During operation, vehicle stability control module 210 can receive information from various vehicle sensors to determine whether the stability control mode should be activated. Communication circuit 201 can be used to transmit and receive information between vehicle stability control module 210 and sensors 210, and vehicle stability control module 210 and vehicle systems 270. Also, sensors 210 may communicate with vehicle systems 270 directly or indirectly (e.g., via communication circuit 201 or otherwise).

In various embodiments, communication circuit 201 can be configured to receive data and other information from sensors 210 that is used in determining whether to activate the stability control mode. Additionally, communication circuit 201 can be used to send an activation signal or other activation information to various vehicle systems 270 as part of entering the stability control mode. For example, as described in more detail below, communication circuit 201 can be used to send signals to one or more of: brake system 276 to control brake torque applied to one or more wheels of the vehicle; torque splitters 274 to control front/rear torque split and left/right torque split. In various embodiments brake torque can be provided in part by one or more drive motors of an electric or hybrid electric vehicle. Accordingly, other vehicle systems 282 may include motor control systems to control one or more drive motors of an electric or hybrid electric vehicle.

Although not illustrated in the example of FIG. 4, in various implementations stability control module 210 may receive data from sources external to the vehicle. For example, infrastructure elements, other vehicles, data service providers, and other instrumentalities may provide relevant data to the vehicle that can be used by stability control module 210 to determine whether an event is occurring (such as, for example, and understeer or oversteer event) and whether action beyond standard ESC operations (e.g. wheel lockup) is required.

Figure 5:
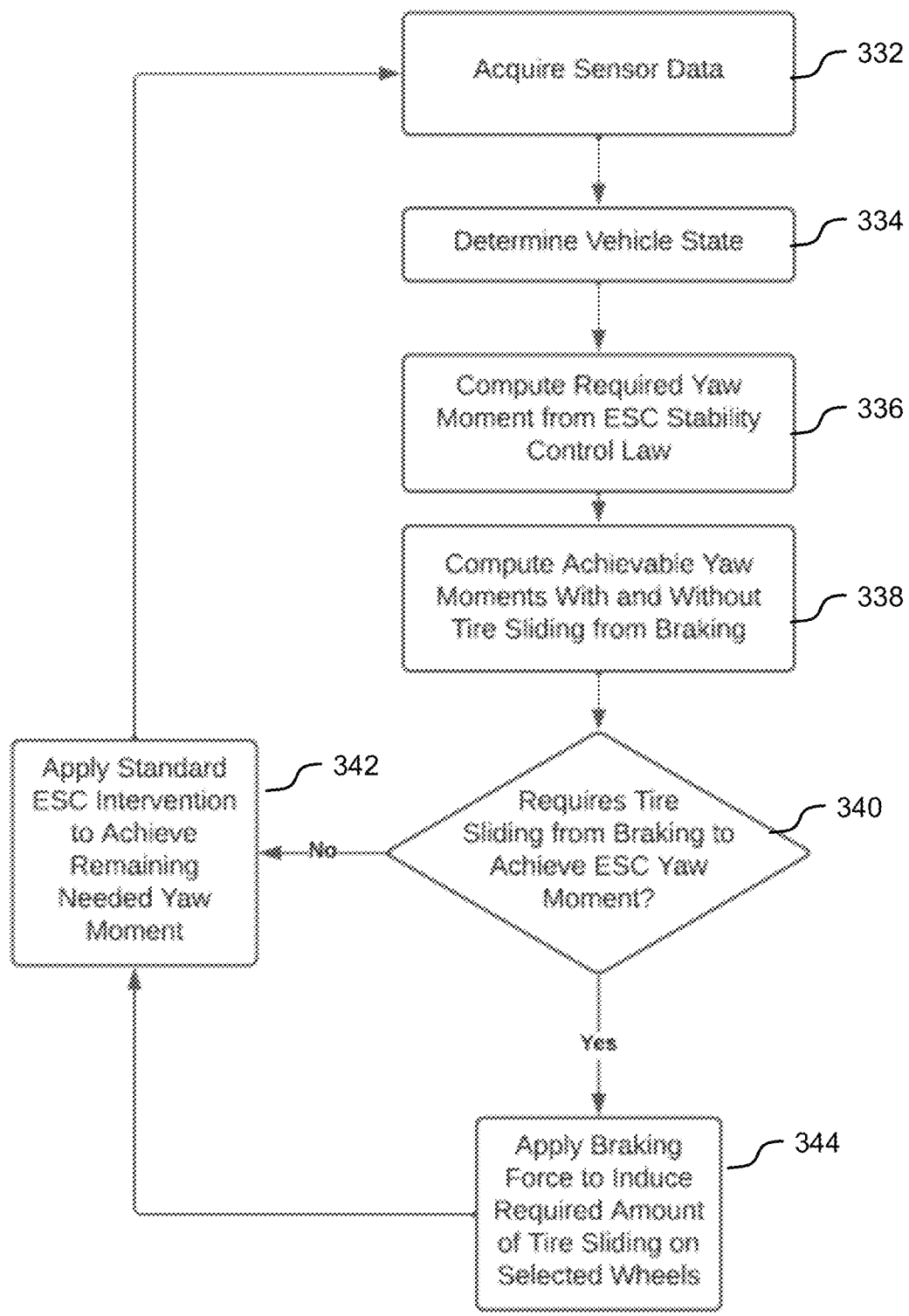
FIG. 5 illustrates an example process for vehicle stability control in accordance with various embodiments of the systems and methods described herein.

FIG. 5 illustrates an example process for vehicle stability control in accordance with various embodiments. Referring now to FIG. 5, this process is described in terms of the example vehicle stability control system 200 described above with reference to FIG. 4. In alternative embodiments, this process may be implemented with other configurations or architectures for a vehicle stability control system 200.

At operation 332 the stability control module (e.g., vehicle stability control module 210 of vehicle stability control system 200) receives sensor data from various vehicle sensors. In terms of the example of FIG. 4, this can include data from, for example, one or more sensors 210 and data from vehicle systems 270. In some implementations, the vehicle stability control module may also receive data from external sources such as, for example, from other vehicles, infrastructure elements and service providers.

At operation 334, the stability control module processes the received information to determine the state of the vehicle such as the existence of an effective understeer gradient. For example, the circuit can look at and evaluate accelerometer data relative to steering angle information to determine whether the vehicle has entered and understeer or oversteer condition. In some embodiments, the system may further be configured to predict a future vehicle state based on vehicle parameter information and vehicle envelope information. Further to this example, the system can be configured to evaluate routing information such as from a GPS device and predict (e.g., based on factors such as vehicle speed, road surface conditions, radius of an upcoming curve, tire type and pressure, suspension settings, vehicle loading, and so on) whether an understeer or oversteer condition is likely to occur when the vehicle reaches an upcoming curve. The system may be configured to determine a magnitude of the effective understeer gradient, which may be expressed, for example, as a scalar value, which may indicate the severity of the condition and the required corrective action. The magnitude of the effective understeer gradient (e.g., the scalar value) may be zero, indicating the vehicle is not in an understeer or oversteer condition, but is tracking as intended. The absolute value of the effective understeer gradient may be greater than zero, indicating that some effective understeer gradient (which may indicate understeer or oversteer, for example) may exist. A negative vs positive effective understeer gradient may indicate the situation encountered. For example, a positive effective understeer gradient may indicate understeer and a negative effective understeer gradient may indicate oversteer (or vice versa).

At operation 336, the stability control module, upon detecting an effective understeer gradient, such as with an understeer or oversteer event, computes a magnitude of a yaw moment required to correct for the determined effective understeer gradient. At operation 338, the stability control module computes yaw moments that can be achieved with wheel lockup and without wheel lockup. Then, at operation 340, the stability control module determines whether wheel lockup is required to achieve the yaw moment needed to correct for the unsafe condition. For example, this can be accomplished by comparing the achievable yaw moments computed at operation 338 with the desired yaw moments computed operation 336 to determine whether or not wheel lockup is required to correct the unsafe condition.

If at operation 340 the system determines that wheel lockup is not required to correct for the unsafe condition, at operation 342 the stability control module applies standard ESC intervention to achieve the yaw moment needed to for example, where the condition is an understeer condition at operation 342 the stability control module can apply a brake torque to the inside rear wheel in an amount that would not lead to wheel lockup in order to induce the desired yaw moment on the vehicle. In some embodiments, the amount and duration of brake torque required (e.g., at a level somewhere between no brake torque applied and maximum brake torque that can be applied without causing lockup) to achieve the required yaw moment is computed and applied at that level.

If, on the other hand, at operation 340 the system determines that wheel lockup is necessary to achieve the required yaw moment to correct for the condition, the process continues at operation 344 where sufficient brake torque is applied to lockup the selected wheel or wheels. The system may be configured to apply a brake torque to a single wheel of the vehicle, such that the amount of brake torque applied is sufficient to lock up the single wheel to create a yaw moment on the vehicle to achieve the yaw moment required to correct the effective understeer gradient. In some embodiments, the yaw moment created identically matches the yaw moment required to correct the effective understeer gradient (to the extent achievable given system tolerances) or closely matches the yaw moment required (e.g., within +/−2%, 3%, 4%, 5%, 10% or other determined percentage). In some embodiments, the amount of yaw moment applied can be less than the yaw moment required to correct the effective understeer gradient to avoid overcorrecting the vehicle and potentially causing confusion or surprising the driver. In other words, the amount of yaw moment applied can be sufficient to mitigate the condition, if not fully correct for it.

Accordingly, the system may be configured such that it is only applying an amount of brake torque sufficient to lock up the wheel in circumstances where lockup is required. This can avoid using lockup where lockup isn't needed to achieve the desired degree of yaw moment. As indicated in the example of FIG. 5, the operation may continue at 344 where standard ESC intervention continues to be applied, or it may be the case that the operations are complete and no further intervention is required. In all cases, the system may continue to acquire and monitor sensor data for additional events.

Although it may be less likely that an autonomous vehicle (especially a fully autonomous vehicle as compared to a human-operated vehicle) will get into an oversteer or understeer condition, circumstances may arise that could cause this to occur. For example, unexpected or un-detected conditions may arise that cause the vehicle to be operated outside of its intended envelope. These might include things such as, for example, sudden changes in road conditions, unexpected obstacles appearing in the path of the subject vehicle, or other events. Accordingly, the various systems and methods described herein may be implemented not only for human-operated vehicles, but also for autonomous vehicles operating at various levels of autonomy.

Figure 6:
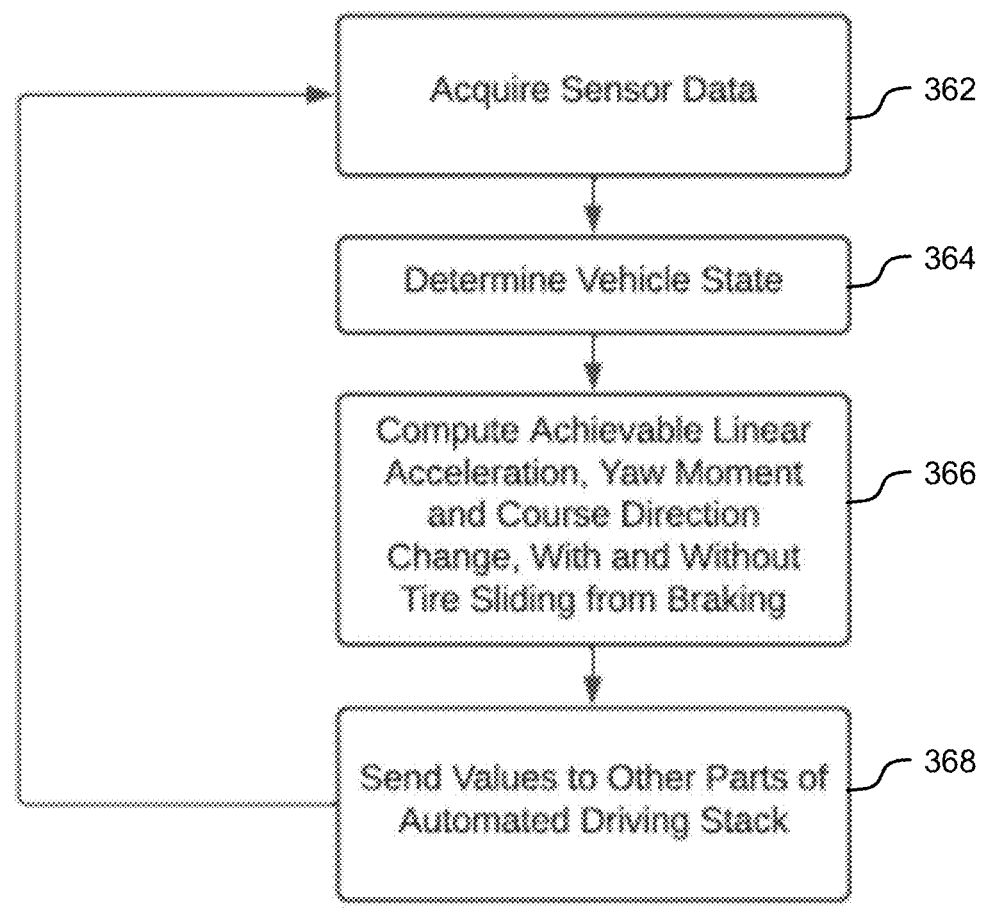
FIG. 6 illustrates yet another example process for vehicle stability control in accordance with various embodiments of the systems and methods described herein.

FIG. 6 illustrates yet another example process for vehicle stability control in accordance with various embodiments. Particularly, FIG. 6 illustrates an example process for vehicle stability control for an autonomous vehicle. At operation 362 the stability control module (e.g., vehicle stability control module 210 of vehicle stability control system 200) receives sensor data from various vehicle sensors. In terms of the example of FIG. 6, this can include data from, for example, one or more sensors 210 and data from vehicle systems 270. In some implementations, the vehicle stability control module may also receive data from external sources such as, for example, from other vehicles, infrastructure elements and service providers.

At operation 364, the stability control module processes the received information to determine the vehicle state. For example, the system may evaluate accelerometer data relative to steering angle information to determine whether the vehicle has entered an effective understeer gradient condition, and the magnitude of such condition. The magnitude of the effective understeer gradient (e.g., the scalar value) may be zero, which may be expressed, for example, as a scalar value, indicating the vehicle is not in an understeer or oversteer condition, but is tracking as intended. The absolute value of the effective understeer gradient may be greater than zero, indicating that some effective understeer gradient (which may indicate understeer or oversteer, for example) may exist. A negative vs positive effective understeer gradient may indicate the situation encountered. For example, a positive effective understeer gradient may indicate understeer and a negative effective understeer gradient may indicate oversteer (or vice versa).

In some embodiments, the system may further be configured to predict a future vehicle state (e.g., a future effective understeer gradient) based on vehicle parameter information and vehicle envelope information. Further to this example, the system can be to evaluate routing information such as from a GPS device, and environmental information such as from LIDAR or other sensors, from V2X communications, from service providers, and so on, to predict (e.g., based on factors such as vehicle speed, road surface conditions, radius of an upcoming curve, lane markings, oncoming or other vehicle traffic, tire type and pressure, suspension settings, vehicle loading, and so on) whether an understeer or oversteer condition is likely to occur when the vehicle reaches an upcoming curve or otherwise encounters driving conditions.

At operation 366, the stability control module computes one or more of a number of vehicle performance parameters. The computed vehicle parameters may include, for example, achievable linear acceleration, yaw moment and course direction change. These can be computed under conditions assuming ESC without brake lockup and with brake lockup. For example, the system might determine the magnitude of yaw moment achievable by applying brake torque to a selected wheel with and without wheel lockup.

At operation 368 the stability control module sends the values computed at operation 366 to the automated driving stack. The system can negotiate tradeoffs between, and analyze combinations of, ESC, wheel lockup and other vehicular controls (e.g., countersteering, avoiding trail braking, slowing the vehicle in advance, and so on). For example, the system may determine that a particular combination of steering input, dynamic chassis control and wheel lockup is the most appropriate manner in which to address the current situation or to achieve the fastest speed through the corner. As this illustrates, where the vehicle has control over a greater number of vehicle inputs combinations of these inputs can be determined based on the current circumstances to achieve the desired performance goal, such as to avoid or correct an effective understeer gradient, avoid a collision, provide the fastest speed through a corner, and so on.

In further embodiments, the system may be configured to use brake lockup to enable the vehicle to carry a greater amount of speed into and through a corner. Using the system to provide desired amounts of yaw moment to the vehicle can enable the vehicle to negotiate corners at a greater speed than would be possible if such control were not applied. This can be implemented to increase the performance envelope of the vehicle.

Figure 7:
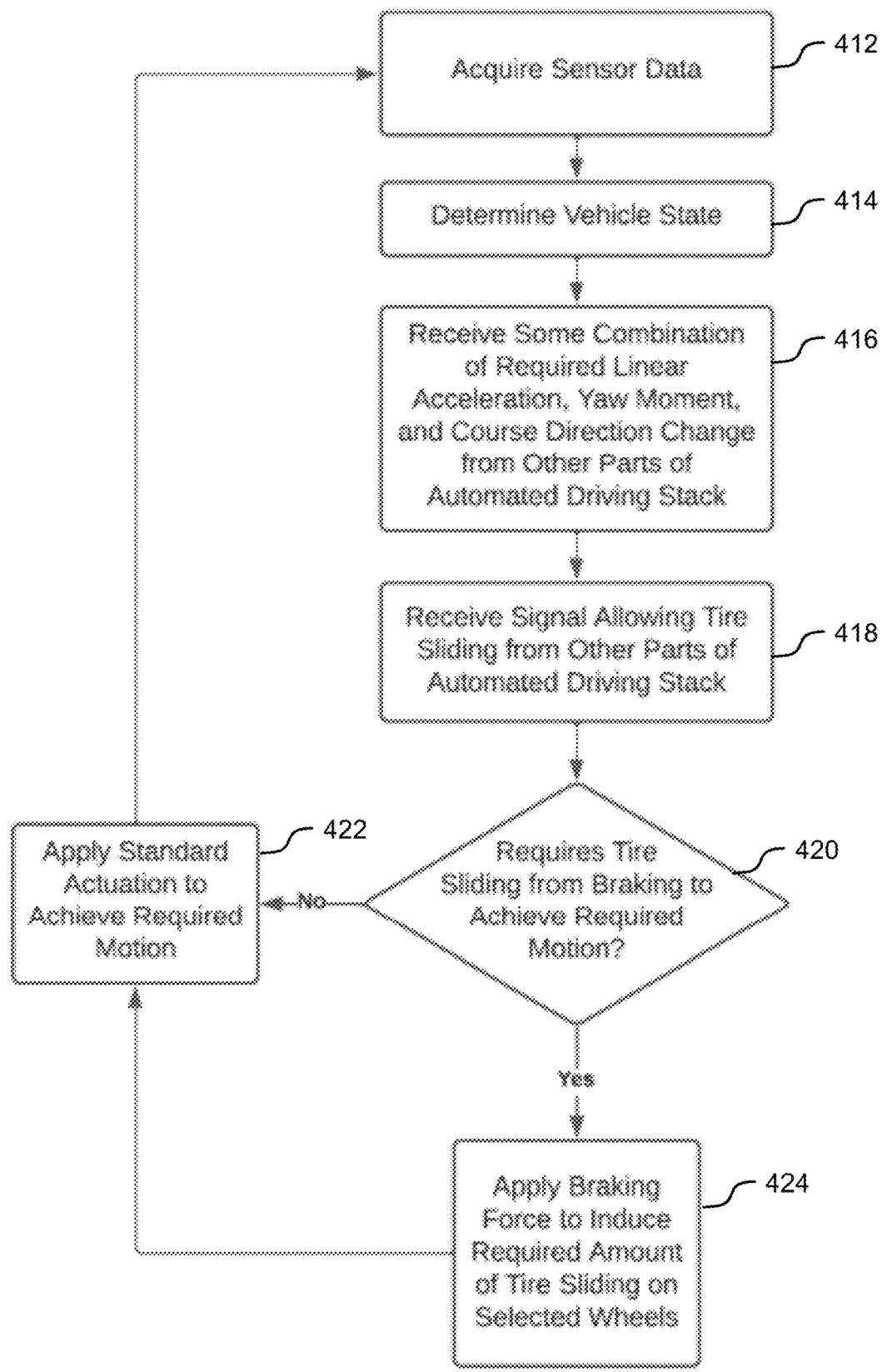
FIG. 7 illustrates yet another example process for vehicle stability control in accordance with various embodiments of the systems and methods described herein.

FIG. 7 illustrates yet another example process for vehicle stability control in accordance with various embodiments. Particularly, FIG. 7 illustrates an example process for vehicle stability control for an autonomous vehicle. At operation 412 the stability control module (e.g., vehicle stability control module 210 of vehicle stability control system 200) receives sensor data from various vehicle sensors. In terms of the example of FIG. 7, this can include data from, for example, one or more sensors 210 and data from vehicle systems 270. In some implementations, the vehicle stability control module may also receive data from external sources such as, for example, from other vehicles, infrastructure elements and service providers.

At operation 414, the stability control module processes the received information to determine the vehicle state. As with other embodiments described herein, the system may be configured to evaluate accelerometer data relative to steering angle information to determine whether the vehicle has an effective understeer gradient (potentially indicating an understeer or oversteer condition) and the magnitude of such condition. The magnitude of the effective understeer gradient may be zero, which may be expressed, for example, as a scalar value, indicating the vehicle is not in an understeer or oversteer condition, but is tracking as intended. The absolute value of the effective understeer gradient (e.g., the scalar value) may be greater than zero, indicating that some effective understeer gradient (which may indicate understeer or oversteer, for example) may exist. A negative vs positive effective understeer gradient may indicate the situation encountered. For example, a positive effective understeer gradient may indicate understeer and a negative effective understeer gradient may indicate oversteer (or vice versa).

In some embodiments, the system may further be configured to predict a future vehicle state based on vehicle parameter information and vehicle envelope information. Further to this example, the system can be configured to evaluate routing information such as from a GPS device and environmental information such as from LIDAR or other sensors to predict (e.g., based on factors such as vehicle speed, road surface conditions, radius of an upcoming curve, lane markings, oncoming or other vehicle traffic, tire type and pressure, suspension settings, vehicle loading, and so on) whether an understeer or oversteer condition is likely to occur when the vehicle reaches an upcoming curve or otherwise encounters driving conditions.

At operation 416, the stability control module receives additional information from the autonomous vehicle regarding other vehicle parameters. For example, the system can receive one or more parameters such as, for example, required a linear acceleration of the vehicle, the yaw moment of the vehicle, and course direction change. This information can be received, for example, from other parts of the automated driving stack. The stability control module (all or part of which may be part of the AV stack), itself or in combination with other components of the AV stack, determines whether to use brake torque to apply a yaw moment to the vehicle (whether or not in combination with other control variables) and if so, how much yaw moment is required.

At operation 418 the stability control module receives information from the AV stack indicating that the system should apply brake torque to induce a given amount of yaw moment on the vehicle. Where the amount of yaw moment requires sliding (brake lockup) to achieve the desired effect (operation 420) at operation 424, the stability control module applies a braking force to induce the desired amount of tire sliding on the selected wheel or wheels. In some embodiments, the yaw moment created identically matches the yaw moment required to correct the effective understeer gradient (to the extent achievable given system tolerances) or closely matches the yaw moment required (e.g., within +/−2%, 3%, 4%, 5%, 10% or other determined percentage). In some embodiments, the amount of yaw moment applied can be less than the yaw moment required to correct the effective understeer gradient to avoid overcorrecting the vehicle and potentially causing confusion or surprising the driver. In other words, the amount of yaw moment applied can be sufficient to mitigate the condition, if not fully correct for it.

On the other hand, where lockup is not required to achieve the desired amount of yaw moment (operation 420), at operation 422 the system uses non-lockup brake torque (e.g., ESC) to achieve the desired motion. Accordingly, the system may be configured such that it is only applying an amount of brake torque sufficient to induce tire sliding in circumstances where sliding is required. This can avoid using tire sliding where it isn't needed to achieve the desired performance.

Any changes that the system may contemplate making in yaw moment may in some implementations be balanced with other factors like the heading of the vehicle. In non-autonomous vehicle applications, or applications where the only control input the system makes is to the brake torque applied to a wheel, the system attempts to stabilize the vehicle or correct the condition using braking only. In autonomous vehicle applications, application of brake torque (and especially in the case of wheel lockup) may be balanced against other control inputs the system may have access to attempt to stabilize the vehicle. Accordingly, embodiments may be implemented in which the system considers other control input options to arrive at a solution that is ideally optimized as compared to a solution that relies only on application of brake torque. For example, in AV applications the system may be configured to apply steering input to adjust the steering of the vehicle in addition to a brake torque to address the situation.

As also noted above, in autonomous vehicle applications, the system may be configured to look at other factors such as route knowledge, road conditions, lane markings, traffic conditions, the vehicle envelope, and so on to use forward looking or predictive information as part of the stability process. This information can provide additional state information on the vehicle.

Additionally, in the case of autonomous vehicles the effects of stabilizing the vehicle using brake torque can be balanced against obstacle avoidance or damage mitigation. For example, in a case where a collision may be unavoidable the system can be configured to adjust the attitude of the vehicle such that a less undesirable impact can be achieved (e.g., adjust the attitude such that the point of impact is at the rear of the vehicle versus the front).

In some implementations the system may be configured to intentionally create high yaw rates to achieve desired effects on the vehicle. For example, the system may be configured to lockup the outside front wheel to induce oversteer, which might be desirable to allow the vehicle to drift around a corner. As also noted, the system may be configured to intentionally create high yaw rates to allow greater control of the vehicle at higher speeds.

In some embodiments, additional information can be used to determine whether, despite its corrective effects, it might be undesirable to apply brake torque to initiate a wheel lockup. For example, the system may determine not to trigger will lockup if doing so would cause a collision, or cause a more severe collision.

Figure 8:
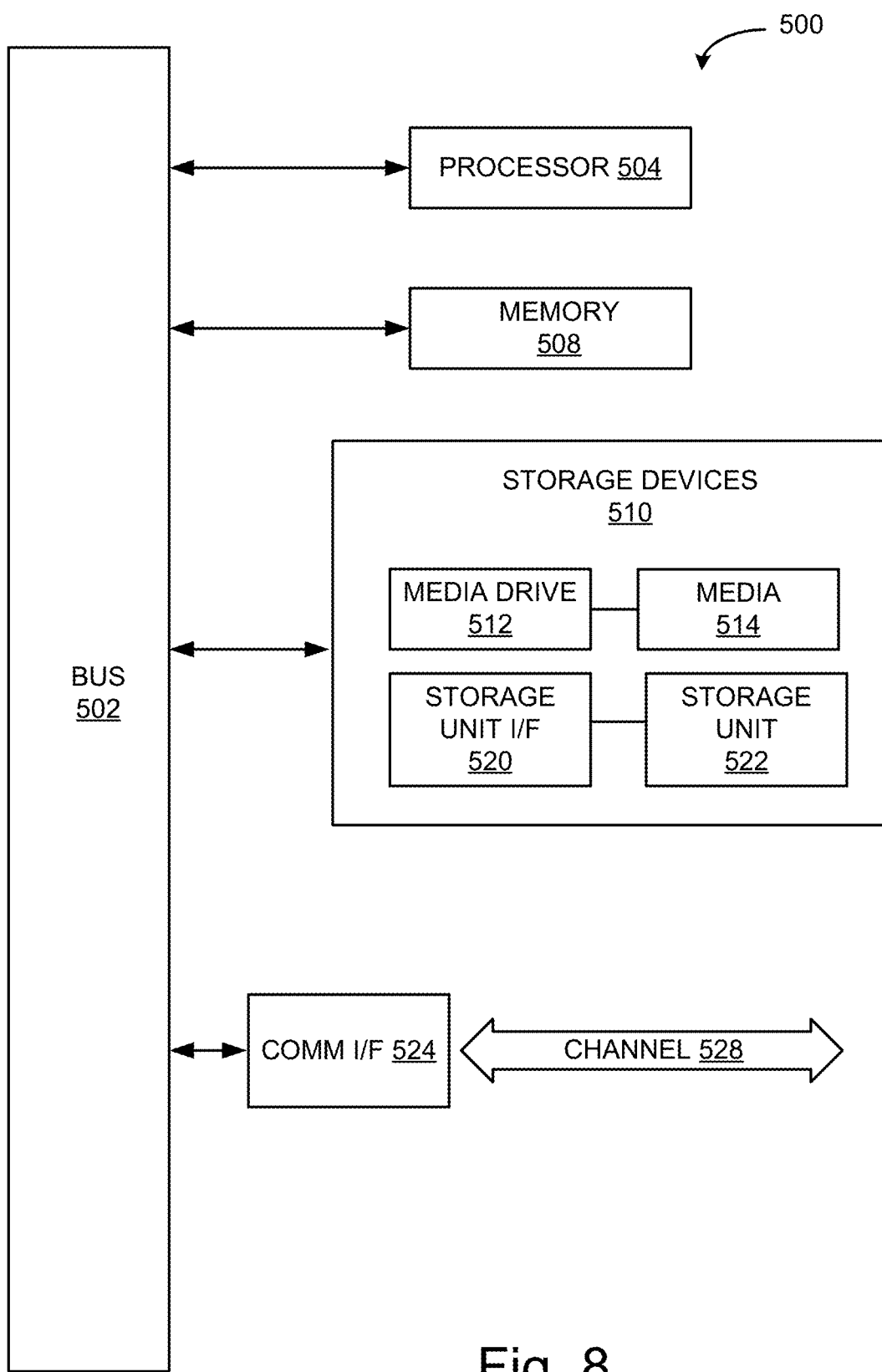
FIG. 8 illustrates an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 500. After reading this description, it will become apparent to a person skilled in the relevant art how to implement the application using other computing components or architectures.

Referring now to FIG. 8, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for controlling a vehicle, comprising:
receiving sensor data from a plurality of sensors, the sensor data comprising vehicle parameter information for the vehicle;
using the sensor data to determine a vehicle state for a vehicle negotiating a corner, wherein the vehicle state comprises information regarding a magnitude of an understeer gradient for the vehicle;
computing a yaw moment required to correct the understeer gradient based on the magnitude of the understeer gradient;
determining yaw moments that can be achieved for the vehicle with wheel lockup and without wheel lockup, and determining, based on the yaw moment required to correct the understeer gradient, whether wheel lockup is required to achieve the yaw moment required; and
applying a brake torque to a single wheel of the vehicle, wherein an amount of brake torque applied is sufficient to lock up the single wheel to create a yaw moment on the vehicle to achieve the computed yaw moment required to correct the understeer gradient.

2. The method of claim 1, further comprising determining a duration of the brake torque to apply to of the single wheel of the vehicle and applying the brake torque to the single wheel for the determined duration.

3. The method of claim 1, further comprising determining whether lockup of the single wheel is required to achieve the yaw moment required to correct the understeer gradient, and only applying an amount of brake torque sufficient to lock up the single wheel in circumstances where lockup is required.

4. The method of claim 1, wherein the sensor data comprises yaw data and steering angle data.

5. The method of claim 1, wherein applying a brake torque to a single wheel of the vehicle to achieve the computed yaw moment required to correct the understeer gradient comprises substantially matching the yaw moment required to correct the understeer gradient.

6. The method of claim 1, wherein applying a brake torque to a single wheel of the vehicle to achieve the computed yaw moment required to correct the understeer gradient comprises achieving a yaw moment a determined amount less than the amount required to correct the understeer gradient to avoid overcorrecting the vehicle.

7. A system for controlling a vehicle, comprising:
a plurality of vehicle sensors;
a processor; and
a memory coupled to the processor to store instructions, which when executed by the processor, cause the processor to perform operations, the operations comprising:
receiving sensor data from the plurality of vehicle sensors, the sensor data comprising vehicle parameter information for the vehicle;
using the sensor data to determine a vehicle state for a vehicle negotiating a corner, wherein the vehicle state comprises information regarding a magnitude of a understeer gradient for the vehicle;
computing a yaw moment required to correct the understeer gradient based on the magnitude of the understeer gradient;
determining yaw moments that can be achieved for the vehicle with wheel lockup and without wheel lockup, and determining, based on the yaw moment required to correct the understeer gradient, whether wheel lockup is required to achieve the yaw moment required; and
applying a brake torque to a single wheel of the vehicle, wherein an amount of brake torque applied is sufficient to lock up the single wheel to create a yaw moment on the vehicle to achieve the computed yaw moment required to correct the understeer gradient.

8. The system of claim 7, wherein the operations further comprise determining a duration of the brake torque to apply to of the single wheel of the vehicle and applying the brake torque to the single wheel for the determined duration.

9. The system of claim 7, wherein the operations further comprise determining whether lockup of the single wheel is required to achieve the yaw moment required to correct the understeer gradient, and only applying an amount of brake torque sufficient to lock up the single wheel in circumstances where lockup is required.

10. The system of claim 7, wherein the sensor data comprises yaw data and steering angle data.

11. The system of claim 7, wherein applying a brake torque to a single wheel of the vehicle to achieve the computed yaw moment required to correct the understeer gradient comprises substantially matching the yaw moment required to correct the understeer gradient.

12. The system of claim 7, wherein applying a brake torque to a single wheel of the vehicle to achieve the computed yaw moment required to correct the understeer gradient comprises achieving a yaw moment a determined amount less than the amount required to correct the understeer gradient to avoid overcorrecting the vehicle.

13. A vehicle, comprising:
a plurality of vehicle sensors;
a braking system; and
a stability control module comprising inputs coupled to receive data from the plurality of vehicle sensors and outputs to control the braking system, the stability control circuit configured to:
receiving sensor data from the plurality of vehicle sensors, the sensor data comprising vehicle parameter information for the vehicle;
use the sensor data to determine a vehicle state for a vehicle negotiating a corner, wherein the vehicle state comprises information regarding a magnitude of a understeer gradient for the vehicle;
compute a yaw moment required to correct the understeer gradient based on the magnitude of the understeer gradient;
determine yaw moments that can be achieved for the vehicle with wheel lockup and without wheel lockup, and determine, based on the yaw moment required to correct the understeer gradient, whether wheel lockup is required to achieve the yaw moment required; and
control the braking system to apply a brake torque to a single wheel of the vehicle, wherein an amount of brake torque applied is sufficient to lock up the single wheel to create a yaw moment on the vehicle to achieve the computed yaw moment required to correct the understeer gradient.

14. The vehicle of claim 13, wherein the stability control module is further configured to determine a duration of the brake torque to apply to of the single wheel of the vehicle and applying the brake torque to the single wheel for the determined duration.

15. The vehicle of claim 13, wherein the stability control module is further configured to determine whether lockup of the single wheel is required to achieve the yaw moment required to correct the understeer gradient, and to only apply an amount of brake torque sufficient to lock up the single wheel in circumstances where lockup is required.

16. The vehicle of claim 13, wherein the sensor data comprises yaw data and steering angle data.

17. The vehicle of claim 13, wherein applying a brake torque to a single wheel of the vehicle to achieve the computed yaw moment required to correct the understeer gradient comprises substantially matching the yaw moment required to correct the understeer gradient.

18. The vehicle of claim 13, wherein applying a brake torque to a single wheel of the vehicle to achieve the computed yaw moment required to correct the understeer gradient comprises achieving a yaw moment a determined amount less than the amount required to correct the understeer gradient to avoid overcorrecting the vehicle.

19. A method for controlling a vehicle, comprising:
receiving sensor data from a plurality of sensors, the sensor data comprising vehicle parameter information for the vehicle;
using the sensor data to determine a vehicle state for a vehicle negotiating a corner, wherein the vehicle state comprises information regarding a magnitude of an understeer gradient for the vehicle;
computing a yaw moment required to correct the understeer gradient based on the magnitude of the understeer gradient;
determining a duration of brake torque to apply to a single wheel of the vehicle based on the yaw moment; and
applying the brake torque to the single wheel of the vehicle for the duration, wherein the brake torque applied is sufficient to lock up the single wheel to create a yaw moment on the vehicle to achieve the computed yaw moment required to correct the understeer gradient.

20. The method of claim 19, further comprising determining yaw moments that can be achieved for the vehicle with wheel lockup and without wheel lockup, and determining, based on the yaw moment required to correct the understeer gradient, whether wheel lockup is required to achieve the yaw moment required.

21. The method of claim 19, further comprising determining whether lockup of the single wheel is required to achieve the yaw moment required to correct the understeer gradient, and only applying an amount of brake torque sufficient to lock up the single wheel in circumstances where lockup is required.

22. The method of claim 19, wherein the sensor data comprises yaw data and steering angle data.

23. The method of claim 19, wherein applying a brake torque to a single wheel of the vehicle to achieve the computed yaw moment required to correct the understeer gradient comprises substantially matching the yaw moment required to correct the understeer gradient.

24. The method of claim 19, wherein applying a brake torque to a single wheel of the vehicle to achieve the computed yaw moment required to correct the understeer gradient comprises achieving a yaw moment a determined amount less than the amount required to correct the understeer gradient to avoid overcorrecting the vehicle.

25. A method for controlling a vehicle, comprising:
receiving sensor data from a plurality of sensors, the sensor data comprising vehicle parameter information for the vehicle;
using the sensor data to determine a vehicle state for a vehicle negotiating a corner, wherein the vehicle state comprises information regarding a magnitude of an understeer gradient for the vehicle;
computing a yaw moment required to correct the understeer gradient based on the magnitude of the understeer gradient;
determining whether lockup of a single wheel of the vehicle is required to achieve the yaw moment required to correct the understeer gradient; and if lockup of the single wheel of the vehicle is required, applying a brake torque to the single wheel of the vehicle, wherein an amount of brake torque applied is sufficient to lock up the single wheel to create a yaw moment on the vehicle to achieve the computed yaw moment required to correct the understeer gradient.

26. The method of claim 25, further comprising determining yaw moments that can be achieved for the vehicle with wheel lockup and without wheel lockup, and determining, based on the yaw moment required to correct the understeer gradient, whether wheel lockup is required to achieve the yaw moment required.

27. The method of claim 25, further comprising determining a duration of the brake torque to apply to of the single wheel of the vehicle and applying the brake torque to the single wheel for the determined duration.

28. The method of claim 25, wherein the sensor data comprises yaw data and steering angle data.

29. The method of claim 25, wherein applying a brake torque to a single wheel of the vehicle to achieve the computed yaw moment required to correct the understeer gradient comprises substantially matching the yaw moment required to correct the understeer gradient.

30. The method of claim 25, wherein applying a brake torque to a single wheel of the vehicle to achieve the computed yaw moment required to correct the understeer gradient comprises achieving a yaw moment a determined amount less than the amount required to correct the understeer gradient to avoid overcorrecting the vehicle.

* * * * *